UNITED STATES PATENT OFFICE.

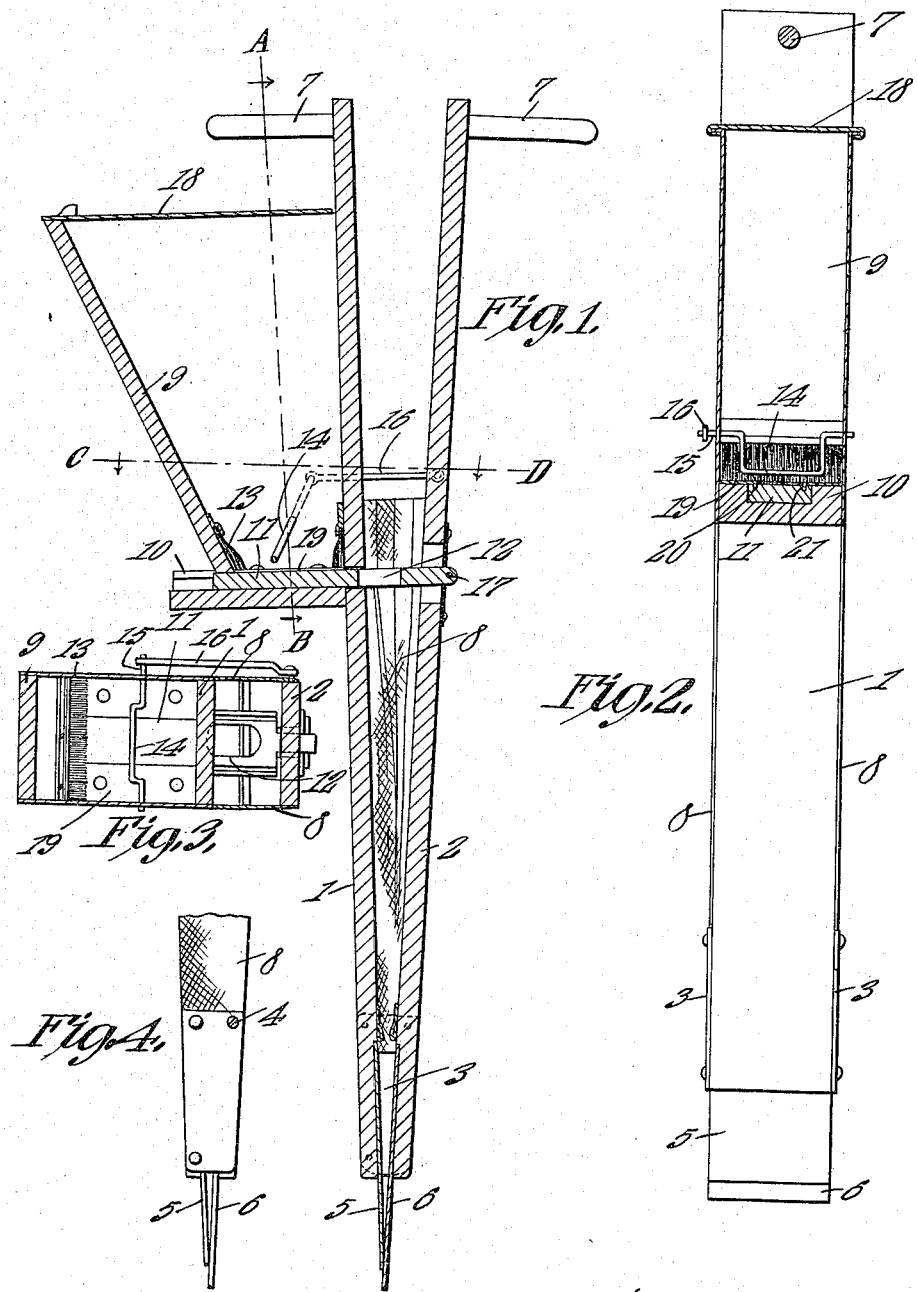

GEORGE TOLIVER, OF MIDDLEBURG, FLORIDA.

FERTILIZER-DISTRIBUTER.

1,176,875.  Specification of Letters Patent.  Patented Mar. 28, 1916.

Application filed July 3, 1915. Serial No. 37,900.

*To all whom it may concern:*

Be it known that I, GEORGE TOLIVER, a citizen of the United States, residing at Middleburg, in the county of Clay and State of Florida, have invented a new and useful Fertilizer-Distributer, of which the following is a specification.

This invention relates to apparatus for distributing fertilizer whereby the fertilizer is placed only at the points desired so that broadcast distribution covering points where the fertilizer is not necessary, is avoided and a considerable saving in the amount of fertilizer necessary for a given area, consequently effected.

A further object is to provide a fertilizer distributer which is simple in construction, can be manipulated readily, and which is useful in distributing any kind of fertilizer, whether moist or dry.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a vertical transverse section through the fertilizer distributer. Fig. 2 is a section on line A—B Fig. 1. Fig. 3 is a section on line C—D Fig. 1. Fig. 4 is a side elevation of the outlet portion of the distributer.

Referring to the figures by characters of reference 1 and 2 designate opposed strips, the strip 1 being provided at one end, with side plates 3 fixedly secured thereto, while the strip 2 is pivotally connected to and extends between these plates, as shown at 4. Secured to the inner face of each strip 1 and 2 at points between the plates 3 are spring cut-off plates 5 and 6, the plate 6 being preferably extended a short distance below the plate 5.

Secured to each of the strips 1 and 2 at the upper end thereof is a handle 7 and connecting the sides of the strips 1 and 2 from the lower ends thereof to points adjacent the handles 7 are flexible side strips 8 which can be arranged to fold in the same manner as collapsible sides of a bellows.

Secured to the strip 1 close to its handle 7 is a hopper 9 the bottom of which has guide cleats 10 in which is mounted a slide 11 having an opening 12. This opening is so located in the slide that when the strips 1 and 2 are pressed against each other, the opening 12 will be exposed in the bottom portion of the hopper 9 so as thus to be filled with a portion of the contents of the hopper. Brushes 13 are preferably provided upon opposed walls of the hopper 9 so as to engage the slide 11. Furthermore an agitating member preferably in the form of a crank 14, is preferably mounted for movement within the hopper 9 and above the slide, this agitating member being provided with a crank arm 15 connected by a link 16 to the strip 2. The slide 11 is pivotally connected to strip 2, as shown at 17.

In using the apparatus the hopper 9 is filled with the fertilizer to be employed, after which said hopper can be closed at its upper end by means of a cover 18 of any suitable construction. When it is desired to deposit some fertilizer on the ground, the strips 1 and 2 are swung toward each other, thus to bring the opening 12 into the lower portion of the hopper 9. The opening will here be filled with a portion of the fertilizer. By then swinging the strips 1 and 2 apart to the positions indicated in Fig. 1, the fertilizer contained in the opening 12 will be conveyed into the space between the strips 1 and 2 and thus gravitate onto the plates 5 and 6 which are, at this time, pressed tightly together. With the parts thus located the plates 5 and 6 are forced into the ground after which, by pressing the strips 1 and 2 toward each other, said plates 5 and 6 will swing apart and thus permit the fertilizer contained therebetween, to enter the opening produced in the ground by the plates 5 and 6. This action of spreading the plates 5 and 6 apart results in bringing the opening 12 again into the hopper 9 where it is refilled, after which by swinging strips 1 and 2 from each other, a new supply of fertilizer will be discharged between said strips 1 and 2 as before. Obviously during this operation of strips 1 and 2 relative to each other, the agitator 14 will be shifted in the hopper so as to keep the contents of the hopper agitated and preventing the apparatus from becoming clogged. This is especially desirable where moist fertilizer is used.

It will be noted that the cleats 10 are provided on their upper faces with guard plates 19. These guard plates have depending portions 20 along the inner edges thereof which extend into longitudinal grooves 21 formed in the top of slide 11. Thus material in the hopper is prevented from becoming lodged between the slide and cleats and interfering with the proper operation of the mechanism.

What is claimed is:—

In a fertilizer distributer, the combination with pivotally connected members and a hopper carried by one of said members, of a slide mounted upon the bottom of the hopper and having longitudinal grooves in the top thereof, guard plates secured to the bottom of the hopper and over-hanging the slide, said plates having depending portions seated within the grooves in the slide, there being an opening in said slide shiftable to position within the hopper to receive material from the hopper, said members when moved relative to each other in one direction, constituting means for shifting the slide to position the opening within the space between the members, brushes secured to opposed walls of the hopper and located within the hopper for engaging the upper surface of the slide, and means operated by the relative movement of the pivotally connected members for agitating the contents of the hopper.

In testimony that I claim the foregoing as my own, I have hereto affixed my signature in the presence of two witnesses.

GEORGE TOLIVER.

Witnesses:
G. R. FRISBEE, Jr.,
E. E. BOBBS.

Copies of this patent may be obtained for five cents each, by addressing the "Commissioner of Patents, Washington, D. C."